(12) United States Patent
Zheng et al.

(10) Patent No.: US 11,054,971 B2
(45) Date of Patent: Jul. 6, 2021

(54) MODULAR RUNTIME ENVIRONMENT

(71) Applicant: salesforce.com, inc., San Francisco, CA (US)

(72) Inventors: Zuye Zheng, San Francisco, CA (US); James Diefenderfer, San Francisco, CA (US); Si Wan Kim, San Francisco, CA (US); Niranjan Yadavali, San Francisco, CA (US); Sandeep Rawat, San Francisco, CA (US); Khushboo Shah, San Francisco, CA (US); Nadeem Aboobaker, San Francisco, CA (US)

(73) Assignee: SALESFORCE.COM., INC., San Francisco, CA (US)

( * ) Notice: Subject to any disclaimer, the term of this patent is extended or adjusted under 35 U.S.C. 154(b) by 108 days.

(21) Appl. No.: 15/603,303

(22) Filed: May 23, 2017

(65) Prior Publication Data
US 2018/0341388 A1 Nov. 29, 2018

(51) Int. Cl.
*G06F 16/25* (2019.01)
*G06F 3/0484* (2013.01)
*G06F 9/54* (2006.01)
*G06T 11/20* (2006.01)
*G06F 9/451* (2018.01)
*G06F 16/904* (2019.01)

(52) U.S. Cl.
CPC .......... *G06F 3/04842* (2013.01); *G06F 9/451* (2018.02); *G06F 9/546* (2013.01); *G06F 16/252* (2019.01); *G06F 16/904* (2019.01); *G06T 11/206* (2013.01); *G06T 2200/24* (2013.01)

(58) Field of Classification Search
CPC .............................. G06F 16/252; G06F 9/451
See application file for complete search history.

(56) References Cited

U.S. PATENT DOCUMENTS

| 4,674,043 A | * | 6/1987 | Hernandez | G06T 11/206 345/440 |
|---|---|---|---|---|
| 5,577,188 A | | 11/1996 | Zhu | |
| 5,608,872 A | | 3/1997 | Schwartz et al. | |
| 5,649,104 A | | 7/1997 | Carleton et al. | |
| 5,715,450 A | | 2/1998 | Ambrose et al. | |
| 5,761,419 A | | 6/1998 | Schwartz et al. | |

(Continued)

OTHER PUBLICATIONS

Non-Final Office Action for U.S. Appl. No. 15/603,111 dated Jul. 3, 2018; 24 pages.

(Continued)

*Primary Examiner* — Alvin H Tan
(74) *Attorney, Agent, or Firm* — Schwabe Williamson & Wyatt

(57) ABSTRACT

Systems, methods, and computer-readable media for implementing a modulate runtime environment (MRTE) are described. The MRTE includes multiple layers that communicate with one another using messages that are routed by connectors. A computer system may implement an MTRE that includes a platform-specific visualization layer and a data layer, which may include a headless execution engine. The data layer may be implemented by multiple types of computing platforms, and the platform-specific visualization layer may be replaced for different computing platforms. Other embodiments may be described and/or claimed.

21 Claims, 5 Drawing Sheets

(56) References Cited

U.S. PATENT DOCUMENTS

| | | | |
|---|---|---|---|
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,047,280 A * | 4/2000 | Ashby | G01C 21/26 701/431 |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,890 B2 * | 4/2003 | Mundell | G06Q 30/02 705/7.32 |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,651,241 B1 | 11/2003 | Hernandez, III | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya | |
| 7,069,497 B1 | 6/2006 | Desai | |
| 7,100,111 B2 | 8/2006 | McElfresh et al. | |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,356,808 B2 * | 4/2008 | Bonsteel | G06F 9/45537 717/138 |
| 7,373,599 B2 | 5/2008 | McElfresh et al. | |
| 7,401,094 B1 | 7/2008 | Kesler | |
| 7,401,131 B2 * | 7/2008 | Robertson | G06Q 10/10 707/999.01 |
| 7,403,975 B2 * | 7/2008 | Berkery | G06F 9/46 709/213 |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,508,789 B2 | 3/2009 | Chan | |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,624,338 B2 * | 11/2009 | Opitz | G06F 9/542 707/999.1 |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly Assaf et al. | |
| 7,945,653 B2 | 5/2011 | Zukerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,190,619 B2 | 5/2012 | Lehtipalo | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,335,784 B2 | 12/2012 | Gutt | |
| 8,457,545 B2 | 6/2013 | Chan | |
| 8,468,545 B2 * | 6/2013 | Townsend | H04M 3/5191 719/313 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,548,973 B1 | 10/2013 | Kritt | |
| 8,566,301 B2 | 10/2013 | Rueben et al. | |
| 8,589,348 B2 | 11/2013 | Tobin et al. | |
| 8,646,103 B2 | 2/2014 | Jakobson et al. | |
| 8,688,640 B2 | 4/2014 | Tobin et al. | |
| 8,726,240 B2 | 5/2014 | Gallagher et al. | |
| 8,745,625 B2 | 6/2014 | Tobin et al. | |
| 8,752,017 B2 | 6/2014 | Hossain et al. | |
| 8,756,588 B2 | 6/2014 | Zheng et al. | |
| 8,818,938 B2 | 8/2014 | Maya et al. | |
| 8,930,327 B2 | 1/2015 | Hossain et al. | |
| 8,972,439 B2 | 3/2015 | Mathew et al. | |
| 9,052,817 B2 * | 6/2015 | Hotelling | G06F 3/04883 |
| 9,075,618 B2 * | 7/2015 | Winternitz | G06F 3/017 |
| 9,092,572 B2 | 7/2015 | Shaphy | |
| 9,189,532 B2 | 11/2015 | Tobin et al. | |
| 9,201,760 B2 | 12/2015 | Zheng | |
| 9,678,935 B2 | 6/2017 | Lu et al. | |
| 9,710,542 B2 | 7/2017 | Hendricksen | |
| 9,817,891 B1 | 11/2017 | Eksteen et al. | |
| 10,114,896 B2 | 10/2018 | Junginger et al. | |
| 10,360,136 B2 | 7/2019 | Zheng et al. | |

(56) References Cited

U.S. PATENT DOCUMENTS

| | | |
|---|---|---|
| 10,380,136 B2 | 8/2019 | Zheng et al. |
| 10,438,168 B2 | 10/2019 | Varadharajan et al. |
| 10,489,405 B2 | 11/2019 | Zheng et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0143567 A1 | 7/2004 | Dettinger |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0144026 A1* | 6/2005 | Bennett .................. G06Q 50/22 714/2 |
| 2007/0150820 A1 | 6/2007 | Salvo |
| 2007/0250472 A1 | 10/2007 | Dettinger et al. |
| 2007/0300151 A1 | 12/2007 | Araki |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky |
| 2011/0247051 A1 | 10/2011 | Bulumulla |
| 2011/0283266 A1 | 11/2011 | Gallagher et al. |
| 2012/0042218 A1 | 2/2012 | Cinarkaya |
| 2012/0233137 A1 | 9/2012 | Jakobson et al. |
| 2012/0233694 A1 | 9/2012 | Baliga |
| 2012/0266244 A1 | 10/2012 | Green |
| 2012/0290407 A1 | 11/2012 | Hubbard et al. |
| 2013/0151572 A1 | 6/2013 | Brocato |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0172821 A1 | 6/2014 | Hu |
| 2014/0201194 A1 | 7/2014 | Reddy |
| 2014/0359537 A1 | 12/2014 | Jackobson et al. |
| 2014/0372412 A1 | 12/2014 | Humphrey |
| 2015/0356188 A1 | 12/2015 | Konik |
| 2016/0162172 A1* | 6/2016 | Rathod .................. G06F 3/0481 715/747 |
| 2016/0188686 A1 | 6/2016 | Hopkins |
| 2017/0169195 A1 | 6/2017 | LiSanti et al. |
| 2017/0344457 A1 | 11/2017 | Wagiaalla |
| 2018/0341388 A1 | 11/2018 | Zheng et al. |
| 2018/0341392 A1 | 11/2018 | Zheng et al. |
| 2018/0341572 A1 | 11/2018 | Zheng |
| 2019/0073612 A1 | 3/2019 | Tobin et al. |

OTHER PUBLICATIONS

Salesforce.com, Inc., Introducing the New Salesforce Analytics Cloud, Everything You Need to Know, Ebook, Feb. 19, 2015, pp. 1-12. Website: https://www.slideshare.net/MishaWilliams/ebook-introducing-wave-analytics-cloud.

Listing of Related Cases, Jun. 7, 2017.

* cited by examiner

MODULAR RUNTIME ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to data processing, and in particular to modular runtime environments.

BACKGROUND

In multi-tenant database systems, tenants may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. The owner/operator of a multi-tenant database system may provide platforms or applications that generate and render visual representations of various data items, datasets, and/or relationships between various data items and/or datasets. Some of these platforms, applications, etc. may be referred to as "dashboards" and the like. Users of the multi-tenant database system (e.g., agents of a particular organization or tenant) may use a dashboard application to obtain data from an associated tenant space, and render/display visual representations of relevant tenant data.

Many dashboard applications operate in a runtime environment (RTE) meant for desktop computers, and these RTEs may be too complex to be implemented in mobile devices. This may be due to the size of the multi-tenant database system, the volume of data residing in the multi-tenant database system, and/or the complexity of logic used to generate and render visual representation of the data. Therefore, many mobile applications are unable to display visual representations with the same quality as those rendered using a dashboard application.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
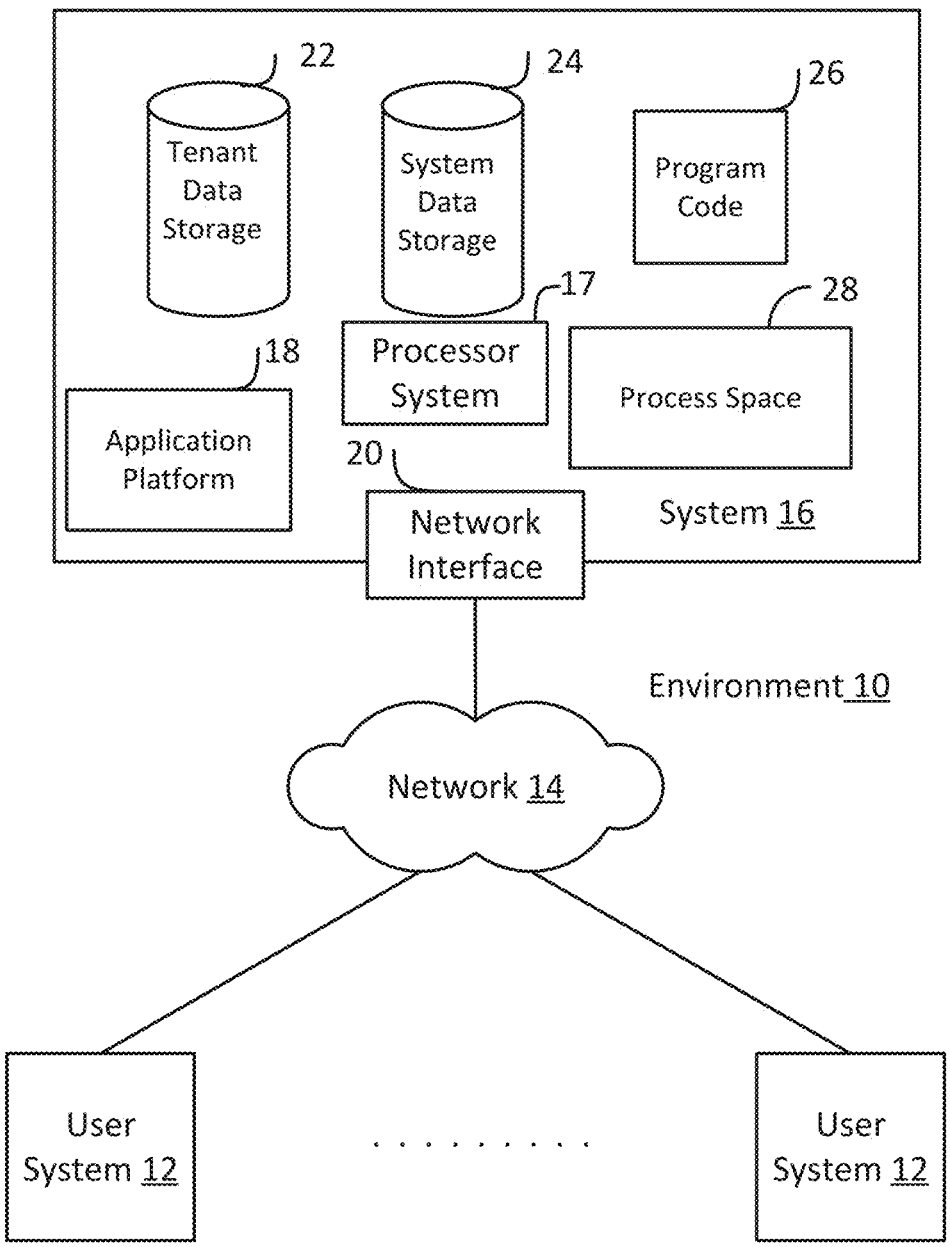
FIG. 1A shows a block diagram of an example environment in which an on-demand database service can be used according to some implementations.

Embodiments discussed herein are directed to modular runtime environments (MRTEs). According to various embodiments, an MRTE may include a dashboard or other like application for generating and displaying visual representations (VRs) of data and/or graphical user interfaces (GUIs) in various computing platforms without having to substantially alter the underlying logic used to render/display the VRs and/or GUIs. The MRTE may include a headless (e.g., capable of working without a GUI) execution engine that may communicate with different widgets within a GUI. The MRTE may include multiple layers that provide functions independent of functions provided by the other layers. For example, the execution engine may be implemented by a data layer or steps layer, the GUI may be implemented by a platform-specific visualization layer and an interaction layer. These layers may communicate with one another through one or more connectors. The connectors may be responsible for routing message to/from different layers, as well as translating or formatting the messages for consumption by the layers. In this way, individual layers may be replaced with new/different layers without requiring each remaining layer to be updated to communicate with the new/different layers. Therefore, the MRTE may provide relatively easy abstraction since each layer is loosely coupled from one another.

In embodiments, the MRTE may be designed as a topic-based publisher/subscriber service. In this service a subscriber may include a particular (e.g., platform specific) GUI, or may include a particular user interface, widget, or graphical control element within the GUI. Additionally, a publisher (or publishing entity) may include a portion of the execution engine responsible for obtaining database objects and/or datasets. These publishers may be referred to as "query lenses." In embodiments, the publishers and subscribers may communicate with one another using topic-based messages. In such embodiments, the publishers may be associated with one or more topics, where the publishers may send messages to subscribers that subscribe to the topics. Messages may be dynamically evaluated to zero or more specific topics. This may allow publishers to send messages to individual subscribers without worrying about how the messages should be mapped to particular subscribers. This may also provide subscribers with the flexibility to subscribe to a broad or narrow range of topics without needing to know the underlying architecture of the MRTE and/or the database system containing the datasets. For example, a subscriber may subscribe to a topic of a specific publisher, or a subscriber may subscribe to a topic of a specific dataset. The publisher may then obtain topic-relevant data from a database system and provide that data for display. The publisher may generate and send more detailed messages to query the database system based on database/tenant selection, result events, or data items of a specific dataset. Multiple publishers may send messages about a particular dataset, but each publisher may evaluate data from the dataset according to an associated topic. This may provide the ability to add topics that capture a different set of messages without altering the messages and/or the publishers themselves for new features.

In various embodiments, the messages may be passed through one or more filters before and/or after topic evaluation prior to being sent to subscribers. This filtering may allow messages to be blocked or delayed for pre-processing of messages before being sent to subscribers. Since all communication is through messages, filters may provide visibility for debugging, performance tracking, visualization capture/replay, and asserting message order.

In various embodiments, the messages may be communicated between subscribers and publishers via connectors. Embodiments may include two types of connectors, runtime connectors and lens connectors. The runtime connectors may facilitate message passing between various layers/entities and particular subscribers. The lens connectors may provide an interface for the execution engine to query a database system for data items, etc. This may provide abstraction so different lenses supporting different interactions can implement data querying differently.

In various embodiments, the GUI/widgets may display visual representations of data (also referred to as "visualizations"). The visualizations may be a part of a "lens," which is a particular view of a dataset's data. The GUI/widgets and/or the visualizations themselves may include graphical control elements that allow a user to transform or otherwise manipulate the visualizations and/or the data represented by the visualizations. In embodiments, any lens may power and drive any widget, and there may be no specific rules regarding the lens and widget types since such rules may force the components to know about the existence of each other. In this way, steps or transformations may be added to any widget and/or may manipulate other visualizations of other widgets/lenses. Further, the absence of compatibility rules may allow lenses and widgets to be tested in isolation.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks" have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome. Opera's browser, or Mozilla's Firefox browser, or the like, allowing a user (for example, a subscriber of on-demand services provided by the system 16) of the user system 12 to access, process and view information, pages and applications available to it from the system 16 over network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, Hypertext Markup Language (HTML), any other markup language. Java™, JavaScript. ActiveX, any other scripting language, such as VBScript, and many other programming languages as are well known may be used. (Java™ is a trademark of Sun Microsystems, Inc.).

Figure 1B:
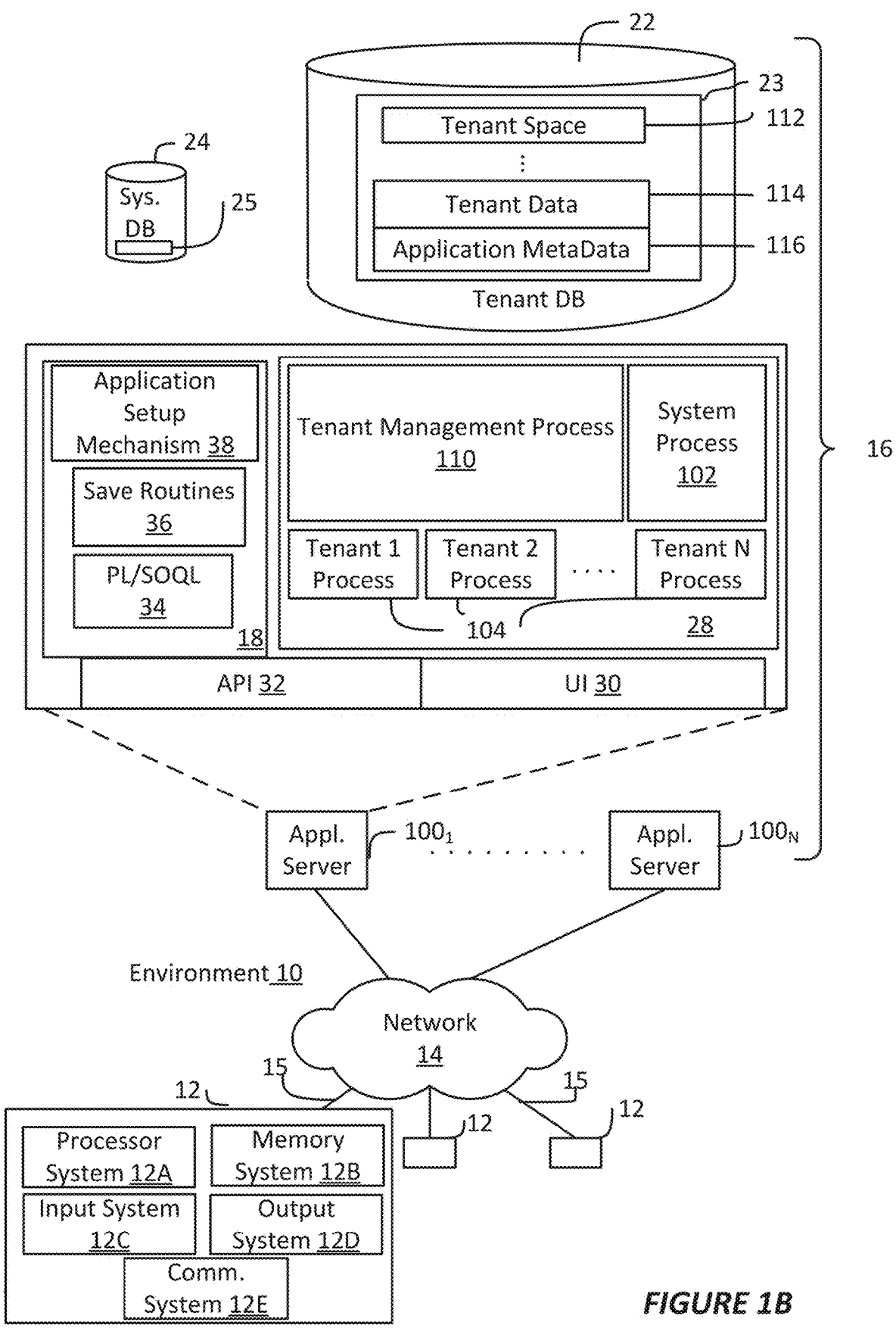
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In such implementations, individual application servers 100 may be configured to perform various database functions (e.g., indexing, querying, etc.) as well as formatting obtained data (e.g., ELT data. ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
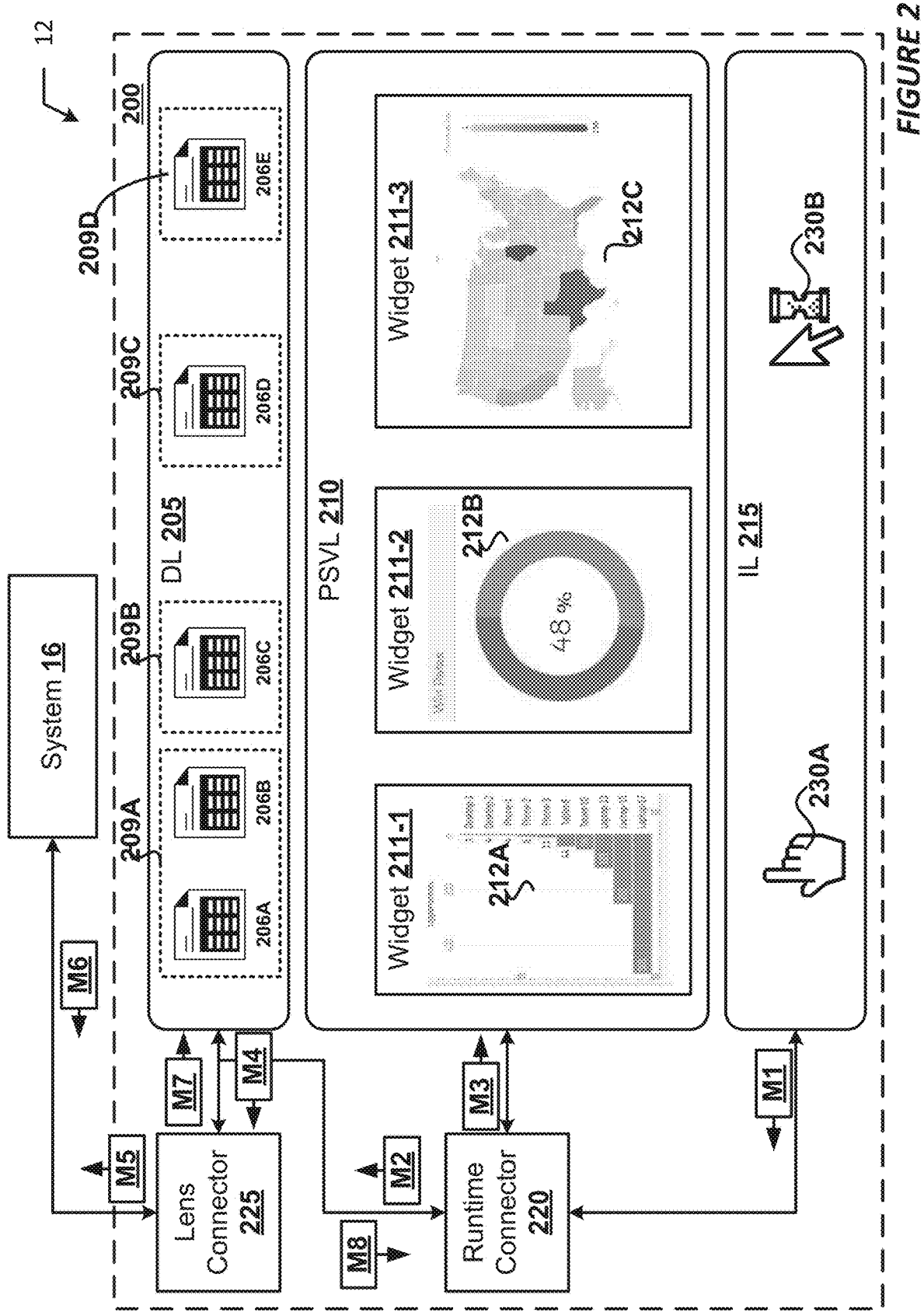
FIG. 2 shows an arrangement in which components of a user system interact with components of a database system, in accordance with various embodiments.

FIG. 2 shows example components of a modulate runtime environment (MRTE) 200 that may be implemented by a user system 12, in accordance with various example embodiments.

The MRTE 200 may be an implementation of an execution model that is used to obtain datasets 206 and render visual representations (VRs) 212 of the datasets 206 based on various interactions 230. The MRTE 200 may comprise program code, software modules, etc., that are stored in the memory system 12B and executed by the processor system 12A. During operation, the MRTE 200 may allow various entities within the MRTE 200 to access system resources, such as the processor system 12A, memory system 12B, input system 12C, output system 12D, communications system 12E, and/or other like resources. Additionally, the MRTE 200 may be executed within an application container or web browser of the user system 12. In this regard, the MRTE 200 may execute programs/scripts and may render markup language documents (e.g., HTML, Extensible Markup Language (XML), JavaScript Object Notation (JSON), etc.) and other content. The programs/scripts may be written in a client-side scripting language, such as JavaScript, Jscript, Ruby, Python, etc. Other languages, such as a proprietary scripting language, may be used as well. As shown, the MRTE 200 may include a data layer (DL) 205, a platform-specific visualization layer (PSVL) 210, and an interaction layer 215 connected by a runtime connector (RC) 220. Additionally, the DL 205 may be communicatively connected to the database system 16 via the lens connector (LC) 225.

The IL 215 may be program code that interacts with the input system 12C to detect user inputs into the system 12. The IL 215 may also determine or identify an interaction type of the user input. For example, when the user system 12 is a mobile device (e.g., a smartphone, tablet computer, wearable device, etc.) the IL 215 may receive a touch indication indicative of a particular touch or gesture 230A (e.g., tap, double tap, tap-and-hold, pinch, drag, drawing of a shape, etc.) and a location of the touch/gesture 230A on a touchscreen of the input system 12C, generate a first message M1 including the touch indication, and send the first message M1 to the RC 225. In this example, the touch indication may be based on an input signal provided to an operating system of the user system 12, an application running on the system 12, another device in communication with the system 12, or any other component internal or external to the system 12. In another example, when the user system 12 is a desktop or laptop computer, the IL 215 may receive an input indication indicative of a mouse click 230B obtained from the input system 12C, generate the first message M1 to include the input indication, and send the first message M1 to the RC 225.

The indication in the first message M1 may indicate an interaction type (e.g., the particular touch/gesture 230A or the particular mouse click 230B), a location of the user interaction 230, trigger or event information, and/or other like information pertaining to the user interaction 230 with the PSVL 210. Additionally, the indication in the first message M1 may indicate a selection of a widget 211, selected data item(s) in a VR 212, desired data item(s) to be obtained based on a selection within a VR 212, a selection of a graphic control element, etc. based on the user interaction 230. The first message M1 may be passed to the RC 220, which may provide the indication to the DL 205.

The RC 220 may be a software connector that connects the various layers of the MRTE 200 to one another so that individual layers do not need to know the underlying details of the other layers. The RC 220 may facilitate message passing between the various layers and and/or components thereof. In this regard, the RC 220 may encapsulate interactions of individual layers and/or communications meant for specific layers (or components thereof). In some implementations, the RC 220 may be a type of exogenous connector, which coordinates and controls a totality of interactions/communications of the components/layers. In such implementations, the components/layers may not invoke method or procedure calls via the RC 220; rather, the RC 220 may perform the method or procedure calls on behalf of a requesting/calling layer. Additionally or alternatively, the RC 220 may be type of middleware or "software glue," which is used to connect two or more separate components by translating or adapting instructions/commands obtained from one layer into instructions/commands that can be understood by another layer. By providing mechanisms for message passing between layers without requiring the layers to be coupled to one another, the RC 220 enables the "modularity" of the MRTE 200.

In embodiments, the RC 220 may obtain, from the IL 205, the first message M1 including the user interaction 230 indication; may extract the indication from the first message M1; and may translate or adapt the indication into an instruction or command for consumption by the PSVL 210 and/or the DL 205. As an example, if the user interaction 230 indicates to change a graph type for widget 211-1, the RC 220 may translate the indication into a command for consumption by the widget 211-1, and pass this command/instruction to the PSVL 210 in a third message M3. As another example, if the user interaction 230 indicates to zoom-in on a particular data item represented by the VR 212A of widget 211-1, the RC 220 may translate the indication into a command for consumption by the DL 205, and pass this command/instruction to the DL 205 in a second message M2.

The DL 205 (also referred to as a "steps layer") may be program code that provides data retrieval and storage functionality for the user system 12. The DL 205 may be a formal interface for widgets 211 to consume information from various data sources in a substantially uniform manner, which may enable a data agnostic infrastructure. The DL 205 may be (or include) a headless execution engine (e.g., capable of working without a GUI) that may communicate with the PSVL 210 and IL 215 via the RC 220. In this way, the DL 205 may be the same or similar regardless of the particular platform of the user system 12, and various platform-specific GUIs (e.g., PSVLs 210) may be switched out or replaced for different user system platforms. A detailed description of some execution engine implementations is discussed in commonly assigned U.S. patent application Ser. No. 15/603,111, titled DASHBOARD EXECUTION ENGINE, by Zuye Zheng et al., filed on May 23, 2017, and hereby incorporated by reference in its entirety and for all purposes.

In embodiments, the execution engine of the DL 205 may receive commands, instructions, etc. from the RC 220. The commands/instructions may be based on the indication in the second message M2, which may be based on user interactions 230 with the VRs 212. The command/instructions in the message M2 may be a script in a first language, and the DL 205 may translate or convert the commands/instructions of the script into a second language for obtaining data. The script of message M2 may be in the form of any suitable scripting language, such as those discussed herein or a proprietary scripting language. The DL 205 (and/or the execution engine) may further provide script validation to verify that the script is valid and for security purposes. The second language for obtaining data may be, for example, a querying language or script, which may be included in a fourth message M4.

In some embodiments, the command/instructions for obtaining data (e.g., included in message M4 and/or message M8) may be based on one or more "steps." A step may include information pertaining to how data items should be represented in a widget 211. Such information may include dataset(s) 206 to query, filter conditions, groupings, etc. Some steps may provide a static list of user-defined values in response to user interactions 230, for example, by showing static values in response to selection (e.g., finger tapping or mouse button clicking) of a graphical control element (e.g., a button, slide, etc.) of a widget 211. Some steps may include a query to be executed against a data source (e.g., referred to as a "query step"). The query may include various clauses, statements, expressions, criteria, conditions, filters, etc. for retrieval of one or more data values/items, records/rows, and/or fields/columns of the datasets 206 stored by the database system 16. The type of query may be based on the data source from which data items are to be obtained. For example, the execution engine may generate a first type of query to be executed against one or more datasets 206 or generate a second type of query to be executed against a database object in the database system 16. The querying language used to generate the queries may be any suitable querying language, such as structured query language (SQL), object query language (OQL), Salesforce® OQL (SOQL), Salesforce® object search language (SOSL), Salesforce® analytics query language (SAQL), and/or other like query languages. The query may be passed to the LC 225 in a fourth message M4 for transmission to the database system 16. If the DL 205 already includes datasets 206 and/or data items required by the commands/instructions, then the DL 205 may simply provide those datasets 206/data items to other layers without querying the database system 16.

The LC 225 may be a connector that is the same or similar as the RC 220; however, the LC 225 may provide an interface for the DL 205 (or execution engine) to query the database system 16 for datasets 206, data items, etc. In embodiments, the LC 225 may send a fifth message M5 (also referred to as a "request message", "request M5", and the like) including the query in the fourth message M4. The request M5 may be an HTTP message where the query may be located in the header or body portion of the HTTP message. Other message types may be used to convey the request M5, such as any of the Internet protocol messages discussed with regard to FIGS. 1A-1B, or a proprietary protocol, where the query is located in the header or body portion of such messages. In response to the queries (e.g., included in message M5), the LC 225 may obtain a sixth message M6 (also referred to as a "response message", "response M6", and the like) including the requested datasets 206, data items, etc. The LC 225 may then pass the obtained datasets 206, desired data items, etc. to the DL 205 in a seventh message M7.

The DL 205 may receive, from the LC 225 in seventh messages M7, datasets 206 (e.g., datasets 206A-E), data items of the datasets 206, and/or other like information. The datasets 206 may be a specific set, subset, and/or transformation of data from one or more data sources (e.g., a tenant space of database 22, ELT/ETL vendor, etc.). In embodiments, the messages M7 may include information, including the data items of one or more queried database objects (e.g., datasets 206) and metadata about the database objects and/or datasets 206 including columns/fields that are measures.

The DL 205 may package or encapsulate the datasets 206, desired data items, etc. in an eighth message M8, and provide the message M8 to the PSVL 210 via the RC 220 for display. In embodiments, the DL 205 may implement publishing entities 209 (e.g., publishers 209A-D as shown by FIG. 2) to package/encapsulate the datasets 206, desired data items, etc. according to an associated topic, and may publish the packaged/encapsulated data to subscribing widgets 211 of the PSVL 210. In such embodiments, the publishers 209 may obtain topic-related information from the database system 16 (e.g., as discussed previously), and may send topic-based messages (e.g., eighth message M8) to subscribers (e.g., one or more widgets 211) that subscribe to a particular topic.

In a first example, and with reference to FIG. 2, publisher 209A may be associated with topic A, which includes data items of datasets 206A and 206B. In this example, the widget 211-1 may be a subscriber of topic A, and the publisher 209A may publish data items or other like information related to topic A for consumption by the widget 211-1.

In a second example, publisher 209B may be associated with topic B, which includes data items of dataset 206C. In this example, the widget 211-2 may be a subscriber of topic B, and the publisher 209B may publish data items or other like information related to topic B for consumption by the widget 211-2.

In embodiments, multiple publishers 209 may send messages M8 about a particular dataset, but each publisher may evaluate data from the dataset according to an associated topic. In a third example, and with reference to FIG. 2, publisher 209C may be associated with a topic C, which includes data items of dataset 206C and publisher 209D may be associated with a topic D, which includes data items of dataset 206E. In this example, the widget 211-3 may be a subscriber of topics C and D, and publishers 209C-D may publish data items or other like information related to topics C-D for consumption by widget 211-3.

In various embodiments, the DL 205 may implement one or more filters (not shown by FIG. 2), and the messages M8 may be passed through the one or more filters before and/or after the topics are evaluated prior to being sent to subscribers. These filters may be used to provide visibility for debugging, performance tracking, capture and replay of VRs 212, asserting message order for testing purposes, and/or the like. Furthermore, the subscribers and the publishing entities 209 may be defined by a tenant/organization developer and/or a system administrator/developer of the database system 16.

The messages M8 for publication may comprise documents in a format that can be interpreted and rendered by the PSVL 210 (also referred to as "visualization data"), such as XML, JSON, and/or some other suitable data format that may be decoded and rendered by an application container and/or browser implemented by the user system 12. The visualization data (VD) may include information, including the desired data items of one or more queried database objects (e.g., datasets 206), metadata about the database objects and/or datasets 206 including columns/fields that are measures, and/or formatting information (e.g., extended metadata (XMD)). The formatting information may include information that allows individual widgets 211 to consume data in a particular manner. Examples of such formatting information may include display labels for dimensions and measures, grouping of measures and dimensions, color for various fields and/or regions of the VRs 212, default columns to be displayed for a values table, dimensions and measures to be hidden in the GUI/widget, custom menus, mapping of org_ids with URLs, and the like. The term "dimension" may refer to any type of qualitative value (e.g., region, product name, model number, etc.), and the term "measure" may refer to any type of quantitative value (e.g., revenue, exchange rate, inventory level, etc.). Additionally, the VD may also include "facets" and/or "bindings," which are information/data in a programmatic language that define interactions among different components of one or more widgets 211. Although both facets and bindings my define interactions among widgets, facets and bindings are different in some respects.

A facet may be a type of automatic filter. Using faceting, a user may select a filtering operation for application to a VR 212 within a widget 211, where the selection of this filtering operation automatically filters all other linked widgets 211 using steps from the same or different datasets 206. The automatic filter may include application of the same or different filtering operations to the other widgets 211 linked to the data presented within the selected VR 212. The linked data may be from the same dataset 206 or other datasets 206. To do this, the DL 205 may identify the selected filtering operation and data to be filtered based on the user interaction 230, identify data linked to the selected data, and automatically inject the selected filtering operation or other filtering operations into the other steps associated with the other widgets 211. For example, a user may select to filter data presented in a first graph showing sales within a selected country, and the DL 205 may instruct another widget 211 in the PSVL 210 to automatically filter a second graph displaying sales of a certain employee to display sales of for that employee within the selected country.

The bindings may bind one or more steps to one or more other steps. In some embodiments, the bindings may include a mapping user interactions and/or data item selections to visualization parameters used for generating VRs 212. In some implementations, there may be two types of bindings, selection bindings and results bindings. The selection or results of one step may trigger updates in other steps.

Selection bindings may update a step based on a selection in another step. Selection bindings may be interaction-driven such that the selection binding is evaluated each time a user selects something in a widget 211. A selection binding may specify interactions between widgets 211 that use steps from different datasets 206; specify filters, measures, groupings, and other aspects of a step query; and specify widget display properties (also referred to as "visualization parameters", "lens parameters", and the like) for various widget types. The widget display properties may include, for example, a selection of data or data type to display from one or more datasets 206; a particular graph, chart, or map in which to view the selected data; color schemes for the graphs/charts/maps; a position or orientation of the graphs/charts/maps within the widget 211, etc. The graphs/charts/maps to be displayed may be referred to as a "lens." A lens may be a particular view of data from one or more datasets 206. The term "dashboard" may refer to a collection of lenses (e.g., the collection of VRs 212 in the PSVL 210). In embodiments, the PSVL 210 may display lenses, dashboards, and/or control panels to alter or rearrange the lenses/dashboards.

Results binding may update a step based on the results of another step. The results bindings may be used to define intermediate results for a complex calculation. For example, to calculate the total opportunity amount for the top-five products, one step may be used to calculate the top-five products and the results of the calculation may be used to filter another step that calculates the total opportunity amount for each of the top-five products. The results bindings may also be used to dynamically change the display of a widget 211 based on the results of a step. For example, a results binding may configure a widget 211 to show different colors based on the value of a measure.

In embodiments, the facets and binding may be in a format such as XML, JSON, and/or any other format discussed herein. In some embodiments, the execution engine of the DL 205 may implement a parser generator (e.g., JISON, GNU Bison, etc.) that may parse a context free grammar or context-free language into an abstract syntax tree (AST), JavaScript code, or some other script or syntax for execution. A detailed description of some facet and binding implementations is discussed in commonly assigned U.S. patent application Ser. No. 15/603,146, titled FILTER OF DATA PRESENTATIONS VIA USER-GENERATED LINKS, by Zuye Zheng et al., filed on May 23, 2017, and hereby incorporated by reference in its entirety and for all purposes.

In embodiments, the messages M8 may be generated by publication entities 209 to include topic-based information for generating and displaying VRs 212 (e.g., data items, fields, and/or records of datasets 206; widget/VR parameters, facets, bindings, etc.). The messages M8 may also include subscriber information, which may allow the RC 220 to route particular information to individual subscribing widgets 211. The DL 205 may send the messages M8 to the RC 220, which as discussed previously, may translate or convert the information of the M8 into a format that can be consumed by the PSVL 210 and/or the individual widgets 211, and may pass the converted/translated information to the PSVL 210 in third messages M3. In embodiments, the RC 220 may route particular messages M3 to individual widgets 211 using the subscriber information contained in the messages M8. In response to receipt of the third messages M3, the individual widgets 211 may obtain the information, and generate and display VRs 212 according to the information in the messages M3.

The PSVL 210 may be a software application designed to run on a particular platform of the user system 12. The term "platform" may refer to a specific hardware architecture, operating system, or other like setup of a computer device (e.g., the user system 12). For example, the PSVL 210 may be different when the user system 12 is a mobile device as opposed to a desktop personal computer. Depending on the platform of the user system 12, the PSVL 210 may be a native application, a web application, or a hybrid application (or variants thereof) that may be developed using platform-specific tools/programming languages, such as a software development environment (SDE), an integrated development environment (IDE), a software development kit (SDK), a software development platform (SDP), or other like platform or framework that allows tenant developers to create applications for accessing a tenant space. As an example, the platform-specific programming language may include Salesforce® Apex, Salesforce® Visualforce®, Salesforce® Lightning®, and/or other like programming languages. As another example, the platform-specific tools may include Salesforce® Wave™ Dashboard Designer, Salesforce® Force.com® IDE, and/or other like SDEs, IDEs, SDKs, SDPs, etc.

The processor system 12A implementing the PSVL 210 may be capable of implementing widgets 211 (e.g., widgets 211-1, 211-2, and 211-3 as shown by FIG. 2) to render graphical user interfaces (GUIs) (e.g., the VRs 212A, 212B, and 212C) in a container or a web browser of the user system 12. The widgets 211 may be software components that perform different functions based on user interactions 230, such as generating and displaying VRs 212 of data, generating and displaying performance indicators, filtering data, etc. In embodiments, the widgets 211 may be platform-specific, such that widgets 211 intended to run on a desktop or laptop computer may be different than widgets 211 intended to run on mobile devices (e.g., smart phones, tablet computers, wearable devices, smart appliances, etc.). In some embodiments, the widgets 211 intended to be run by desktop/laptop computers may be part of a web application that is run in a web browser, and the widgets 211 intended to be run by mobile devices may be part of a native mobile application (app) that runs in an application container or a mobile web app that runs in a mobile web browser. In various embodiments, the widgets 211 may be a part of a data analytics GUI, such as Salesforce® Wave™ dashboard, which may provide visual representations of data residing in an enterprise cloud or in an on-demand services environment (e.g., a tenant space within database system 16). The widgets 211 may be developed using any of the aforementioned programming languages and/or development tools.

The widgets 211 may include VRs 212 and steps (not shown by FIG. 2). The VRs 212 (also referred to as "visualizations") may be part of a "lens," which may be a particular view of data items of one or more datasets 206. The VRs 212 may comprise graphs or charts, such as a line graph, bar chart, donut chart, timeline, geographic map, heat map, tabular charts (e.g., comparison tables, pivot tables, etc.), and/or other like views of data. For example, as shown by FIG. 2, the widget 211-1 includes a bar graph VR 212A, widget 211-2 includes a pie chart VR 212B, and widget 211-3 includes map VR 212C. The term "dashboard" may refer to a collection of lenses. Although not shown by FIG. 2, in some embodiments the widgets 211 and/or the dashboard may include one or more graphical control elements (e.g., buttons, check boxes, scroll bars, slides, etc.) that may be used to alter or adjust the lenses. As discussed previously, the steps may indicate one or more actions or calculations to be performed on both data represented by the VRs 212 and the VRs 212 themselves in response to user interactions 230 (e.g., selection of a type of graph to be displayed based on query results, changing a type of graph in response to a trigger or user input, etc.). In various embodiments, any lens may power and/or drive any widget 211, and there may be no specific compatibility rules between specific lens types and widget types. In this way, any type of step may be added to a widget 211.

In the example shown by FIG. 2, instructions/commands/information communicated between the various elements of the MRTE 200 are conveyed using messages M1-M8. It should be understood that the numerical labeling of the messages is used to differentiate the messages from one another and should not be construed as denoting order, priority, importance, etc. In various embodiments, messages M1-M8 may be in the form of any suitable language/format, such as those discussed herein and/or other like formats/ languages. Additionally, although FIG. 2 shows three layers connected to one another via a single connector (e.g., RC 220), it should be noted that the layers may be combined or subdivided into other layers in a multitude of implementations, arrangements, and/or platforms.

Figure 3:
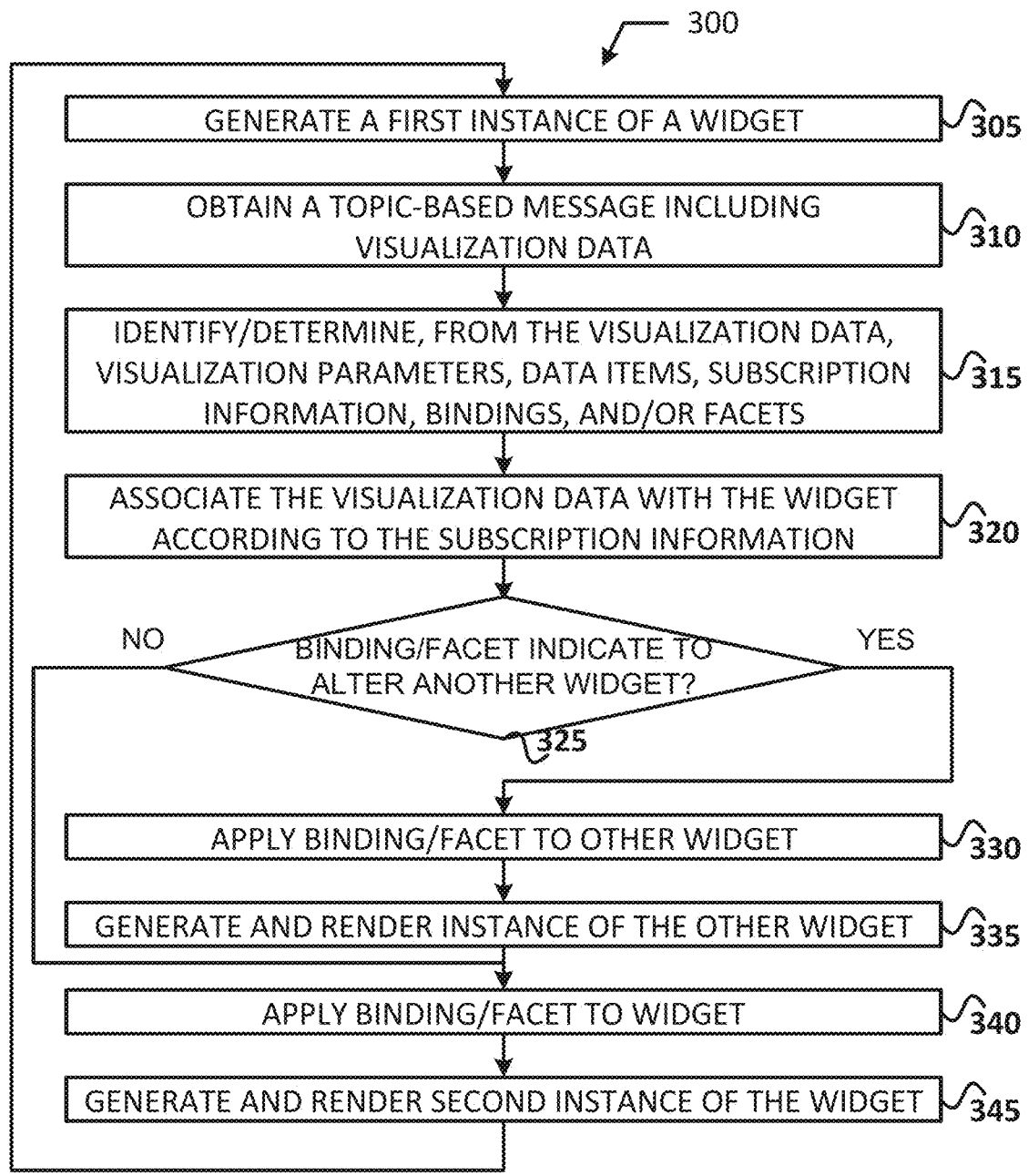
FIG. 3 illustrates an example process for implementing a platform-specific visualization layer, in accordance with various embodiments.
Figure 4:
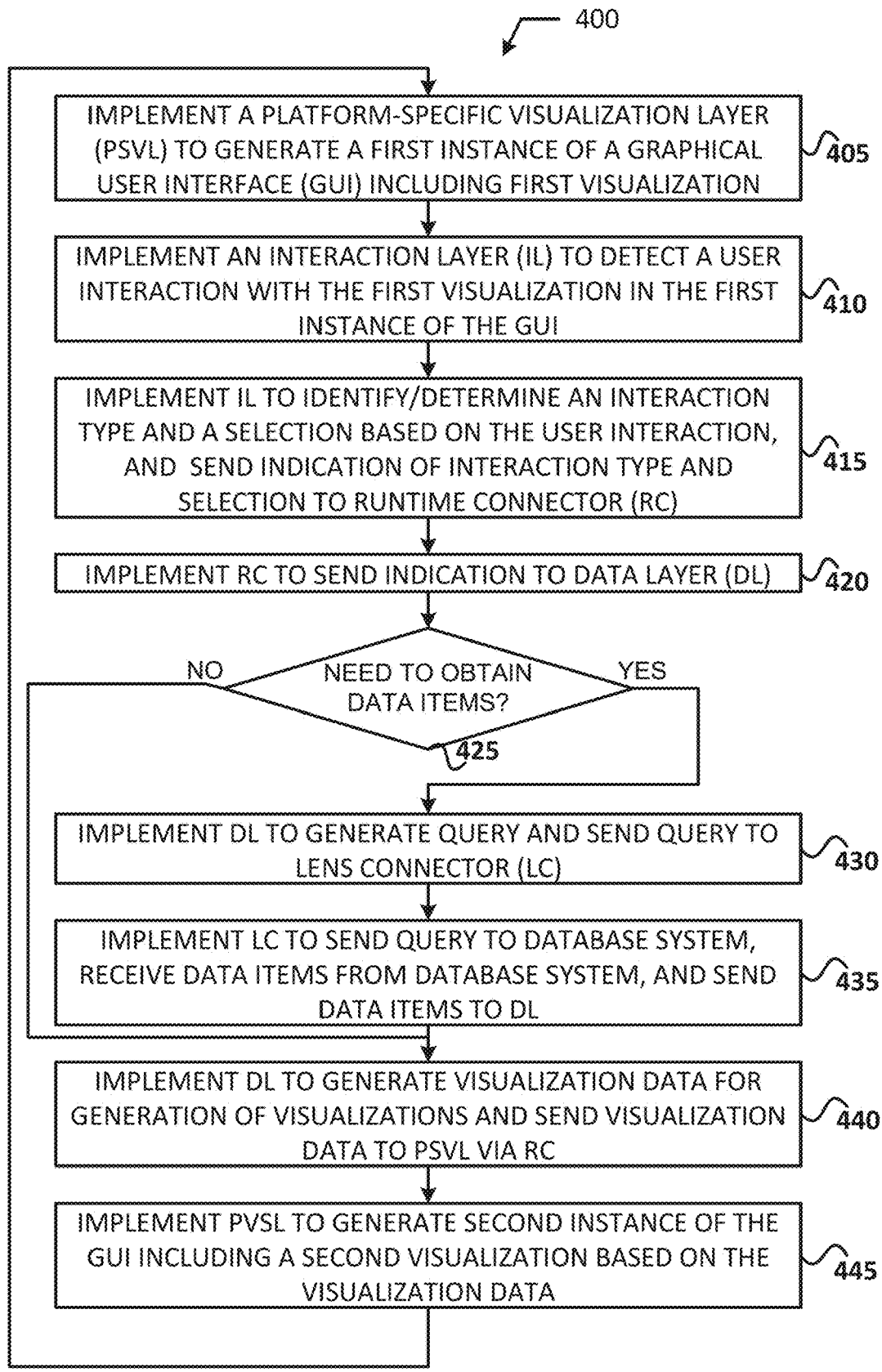
FIG. 4 illustrates an example process for implementing an modular runtime environment, in accordance with various embodiments.

FIGS. 3-4 illustrates processes 300-400, respectively, in accordance with various embodiments. For illustrative purposes, the operations of processes 300-400 are described as being performed by a user system 12 discussed with regard to FIGS. 1A-B and 2. However, other computing devices may operate the processes 300-400 in a multitude of implementations, arrangements, and/or environments. In embodiments, the user system 12 may include program code stored in a memory system 12B, which when executed by a processor system 12A, causes the user system 12 to perform the various operations of processes 300-400. While particular examples and orders of operations are illustrated in FIGS. 3-4, in various embodiments, these operations may be re-ordered, separated into additional operations, combined, or omitted altogether.

FIG. 3 illustrates a process 300 for implementing a platform-specific visualization layer 210, in accordance with various embodiments. Process 300 may begin at operation 305, where a processor system 12A may generate a first instance of a widget 211. In embodiments, the first instance of the widget may include a VR 212 of a predetermined starting or beginning screen, a VR 212 of previously viewed data from a previous session, and the like. In such embodiments, the processor system 12A may implement a browser or application container to execute VD of the starting/beginning screen, previously obtained VD, and the like. At operation 310, the processor system 12A may obtain a topic-based message (e.g., a message M3 as shown by FIG. 2), which may include VD. The VD may comprise a document that can be interpreted by the browser/application container for generating and rendering a VR 212. At operation 315, the processor system 12A may identify or determine VP, data items, subscription information, binding(s), and/or facet(s).

At operation 320, the processor system 12A may associate the VD (e.g., the VP, data items, binding(s), and/or facet(s)) with the widget according to the subscription information. For example, the subscription information may include or indicate one or more topics, a publishing entity 209 identifier (ID) that produced the VD, widget 212 ID, and/or other like information. In embodiments, the processor system 12A may evaluate the one or more topics indicated by the subscription information, and identify one or more widgets that are subscribers to the identified topic(s). The processor system 12A may use this information to generate a VR 212 in the correct widget 211.

At operation 325, the processor system 12A may determine whether the binding(s) and/or facet(s) indicate to alter or adjust data items and/or other like information in another widget. If at operation 325 the processor system 12A determines that the binding(s) and/or facet(s) do not indicate to alter or adjust data items and/or other like information in another widget, then the processor system 12A may proceed to operation 340 to apply the bindings(s) and/or facet(s) to the widget.

If at operation 325 the processor system 12A determines that the binding(s) and/or facet(s) indicate to alter or adjust data items and/or other like information in another widget, then the processor system 12A may proceed to operation 330 to apply the binding(s) and/or facet(s) to the other widget. This may include identifying any data items to be displayed by the widget that are linked to other data items to be displayed by the other widget, and executing one or more steps and/or automatically applying one or more filtering operations to the other data items to be displayed by the other widget. At operation 335, the processor system 12A may generate and render an instance of the other widget to include a VR 212 of adjust/altered data items.

At operation 340, the processor system 12A may apply the binding(s) and/or facet(s) of the VD to the data items and/or dataset(s) 206 to be displayed by the widget. This may include executing one or more steps and/or applying one or more filtering operations to the data items and/or dataset(s) 206. At operation 345, the processor system 12A may generate and render a second instance of the widget according to the obtained VD, which may include a second VR 212. After performance of operation 345, process 300 may end or repeat as necessary.

FIG. 4 illustrates a process 400 for implementing an MRTE 200, in accordance with various embodiments. Process 400 may begin at operation 405, where processor system 12A may implement or operate a PSVL 205 to generate a first instance of a GUI including a first VR 212. At operation 410, the processor system 12A may implement or operate an IL 215 to detect a user interaction 230 with the first VR 212. At operation 415, the processor system 12A may implement or operate the IL 215 to identify or determine an interaction type and a selection based on the user interaction 230, and to send an indication of the interaction type and selection (e.g., in a first message M1 as shown by FIG. 2) to an RC 220. At operation 420, the processor system 12A may implement or operate the RC 220 to route the indication to a DL 205 (e.g., in a second message M2 as shown by FIG. 2).

At operation 425, the processor system 12A may implement or operate the DL 205 to determine, based on the indication, whether to obtain data items from a database system 16, for example, as opposed to needing to update data items from a previously obtained and stored dataset 206 and/or needing to filter already displayed data items. If at operation 425 the processor system 12A implementing the DL 205 determines that data items are not needed from the database system 16, the processor system 12A may proceed to operation 440 to generate visualization data for the generation of VRs 212.

If at operation 425 the processor system 12A implementing the DL 205 determines that data items not needed from the database system 16, the processor system 12A may proceed to operation 430 to implement or operate the DL 205 to generate a query and to provide the query to an LC 225 (e.g., in a fourth message M4 as shown by FIG. 2). At operation 435, the processor system 12A may implement or operate the LC 225 to send the query to the database system 16, receive data items and/or dataset(s) 206 from the database system 16, and send the obtained data items and/or dataset(s) 206 to the DL 205. In embodiments, the LC 225 may repackage and/or include the query in a message (e.g., a fifth message M5 as shown by FIG. 2) in accordance with a wired or wireless communications protocol.

At operation 440, the processor system 12A may implement or operate the DL 205 to generate VD for generation of VRs 212 based on the indication, and may send the VD to the PVSL 205 via the RC 220. The VD may include VP, data items to be displayed (if any), binding(s), and/or facet(s), which may be interpreted by the PVSL 205 for generating and rendering the second instance of the GUI. At operation 445, the processor system 12A may implement or operate the PVSL 205 to generate the second instance of the GUI including the second VR 212 based on the VD. After performance of operation 440, process 400 may end or repeat as necessary.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that the) have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable storage media (NTCRSM) comprising instructions, wherein execution of the instructions by one or more processors of a client device is to cause the client device to:
implement a platform-specific visualization layer (PSVL) to generate a first instance of a graphical user interface (GUI) in a manner specific to a platform of the client device, the first instance of the GUI including a first visual representation of a dataset;
implement an interaction layer (IL) to detect a user interaction with a portion of the first visual representation, and determine an interaction type and a data item selection of the user interaction;
implement a data layer (DL) to generate visualization data (VD) for consumption by the PSVL based on the detected selection and the interaction type;
implement a runtime connector (RC) to coordinate and control a totality of interactions between the DL, the PSVL, and the IL, the coordination and control of the interactions including:
translation of the detected selection and the interaction type into a command for consumption by the DL,
communication of an indication of the detected selection and interaction type from the IL to the DL based on the translation, and
route topic-based messages including the VD from the DL to individual widgets in the PSVL based on a mapping of topics to subscribers, the individual widgets being subscribers to one or more topics, the detected selection being a topic among the topics; and
implement the PSVL to generate a second instance of the GUI including a second visual representation of the dataset based on the VD.

2. The one or more NTCRSM of claim 1, wherein execution of the instructions is to cause the client device to:
implement the IL to generate a first message comprising the indication;
implement the RC to:
obtain the first message from the IL,
generate a second message encapsulating the indication,
send the second message to the DL,
obtain the VD from the DL, the VD including desired data items obtained based on the detected selection,
generate a third message encapsulating the VD, and
send the third message to the PSVL.

3. The one or more NTCRSM of claim 2, wherein execution of the instructions is to cause the client device to:
implement the DL to generate a query in response to receipt of the second message, the query including parameters for obtaining the desired data items;
implement a lens connector to:
obtain a fourth message comprising the query from the DL,
generate a fifth message encapsulating the query,
send the fifth message to a database system,
obtain a sixth message including the desired data items from the database system,
generate a seventh message encapsulating the data items, and
send the seventh message to the DL.

4. The one or more NTCRSM of claim 3, wherein execution of the instructions is to cause the client device to:
implement the RC to:
obtain an eighth message from the DL, the eighth message comprising the VD including the desired data items obtained from the database system, and
generate the third message to include the VD.

5. The one or more NTCRSM of claim 4, wherein execution of the instructions is to cause the client device to:
implement the DL to generate the VD to include a binding or a facet, the binding is to indicate visualization parameters for generating and rendering the second visual representation of the dataset based on the interaction type and the data item selection, and the facet is to automatically filter data for display in one or more widgets based on the interaction type and the data item selection.

6. The one or more NTCRSM of claim 5, wherein execution of the instructions is to cause the client device to: implement the PSVL to:

identify the VD in the third message, generate the second instance of the GUI including the second visual representation according to the visualization parameters of the VD and including a visualization of the desired data items, and render the second visual representation in a browser or an application container of the client device.

7. The one or more NTCRSM of claim 6, wherein execution of the instructions is to cause the client device to: implement the DL to generate the VD according to a topic associated with the interaction type or the data item selection, and wherein, to generate the second instance of the GUI, execution of the set of instructions, when executed by the processing device, is operable to cause the client device to implement the PSVL to:

identify subscription information in the third message, the subscription information indicating a publishing entity within the DL, determine a subscribing widget of the one or more widgets based on the subscription information, and render the second visual representation in the subscribing widget, the subscribing widget being within the browser or the application container.

8. The one or more NTCRSM of claim 1, wherein the platform of the client device is a mobile computing platform or a non-mobile computing platform, the PSVL is specific to a platform of the client device, and the DL and RC are not specific to the platform of the client device.

9. A user system, comprising:

processor circuitry coupled with memory circuitry;

an input system coupled to the processor circuitry, and an output system coupled to the processor circuitry;

the memory circuitry to store program code of a modular runtime environment (MTRE), the MTRE comprising a platform-specific visualization layer (PSVL) coupled with an interaction layer (IL) via a runtime connector (RC), and a data layer (DL) coupled with the PSVL and the IL via the RC, and the processor circuitry is to operate an interaction layer (IL) to:

obtain, from the input system, a signal indicative of a user interaction with a portion of a first visual representation of a dataset, determine an interaction type and a data item selection of the user interaction, and generate a first message including a determined indication;

the processor circuitry is to operate the RC to:

obtain the first message from the IL including the indication, translate the indication into a format that is consumable by the DL, generate a second message encapsulating the translated indication, and send the second message to the DL;

the processor circuitry is to operate the DL to generate visualization data (VD) based on the translated indication of the detected data item selection and the interaction type from the IL;

the processor circuitry is to operate the PSVL to generate a second visual representation of the dataset based on the VD, and provide the second visual representation to the output system for display, the first visual representation and the second visual representation being generated in a manner specific to a platform of the user system; and the processor circuitry is to operate the RC to route topic-based messages including the VD from the DL to individual widgets in the PSVL based on a mapping of topics to subscribers, the individual widgets being subscribers to one or more topics, and the detected selection being a topic among the topics.

10. The user system of claim 9, wherein the processor circuitry is to operate the RC to:

obtain the VD from the DL, the VD including desired data items obtained based on the detected selection, generate a third message encapsulating the VD, and send the third message to the PSVL.

11. The user system of claim 10, wherein the processor circuitry is to operate a lens connector (LC) to:

obtain a fourth message comprising a query from the DL, generate a fifth message encapsulating the query, send the fifth message to a database system, obtain a sixth message including the desired data items from the database system, generate a seventh message encapsulating the data items, and send the seventh message to the DL, and wherein the processor circuitry is to operate the DL to generate the query in response to receipt of the second message, the query including parameters for obtaining the desired data items.

12. The user system of claim 11, further comprising:

a communications system communicatively coupled with the processor circuitry , and the processor circuitry is to operate the LC to provide the fifth message to the communications system for transmission to the database system over a wired or wireless network.

13. The user system of claim 11, wherein the processor circuitry is to operate the RC to:

obtain an eighth message from the DL, the eighth message comprising the VD including the desired data items obtained from the database system;

generate the third message to include the VD; and route the third message to a widget of the PSVL based on a mapping of topics to subscribers, the widget being a subscriber of the subscribers and the detected selection being a topic of the topics.

14. The user system of claim 13, wherein the processor circuitry is to operate the DL to:

generate the VD to include a binding or a facet, the binding is to indicate visualization parameters for generating and rendering the second visual representation of the dataset based on the interaction type and the data item selection, and the facet is to automatically filter data for display in one or more widgets based on the interaction type and the data item selection.

15. The user system of claim 14, wherein the processor circuitry is to operate the PSVL to:

identify the VD in the third message;

generate the second visual representation according to the visualization parameters of the VD and including a visualization of the desired data items; and render the second visual representation in a browser or an application container of the user system.

16. The user system of claim 15, wherein processor circuitry is to:

operate the DL to generate the VD according to a topic associated with the interaction type or the data item selection; and operate the PSVL to:

identify subscription information in the third message, the subscription information indicating a publishing entity within the DL, determine a subscribing widget of the one or more widgets based on the subscription information, and render the second visual representation in the subscribing widget, the subscribing widget being within the browser or the application container.

17. One or more non-transitory computer-readable storage media (NTCRSM) comprising instructions for a runtime connector (RC), wherein execution of the instructions by one or more processors of a client device is to cause the client device to:

for each user interaction with a widget of a set of widgets in a platform-specific visualization layer (PSVL) indicated by an interaction layer ILL) communicatively coupled with the RC, implement the RC to coordinate and control a totality of interactions between a data layer (DL), the PSVL, and the IL, wherein the coordination and control of the interactions includes:

translation of the user interaction into a command for consumption by the DL based on a topic associated with the user interaction, the widget being a subscriber to the topic, passing of the command to the DL, communication of a topic-based message published by one or more datasets in the DL associated with the topic, the topic-based message including visualization data (VD) for generation of a visual representation (VR) of data of the one or more datasets based on the detected user interaction, and routing of the topic-based message including the VD to the PSVL for generation of an instance of the widget including the VR of the data of the one or more datasets based on the VD, the routing being based on a mapping of topics to subscribers, and the instance of the widget being generated in a manner specific to a platform of the client device.

18. The one or more NTCRSM of claim 17, wherein execution of the instructions is operable to cause the client device to:

convert the topic-based message into a format that can be consumed by the widget.

19. The one or more NTCRSM of claim 18, wherein to route the topic-based message to the PSVL, execution of the instructions is operable to cause the client device to:

identify subscriber information in the topic-based message; and determine one or more widgets in the set of widgets that are subscribers to the topic based on the subscriber information.

20. The one or more NTCRSM of claim 18, wherein, to convert the topic-based message, execution of the set of instructions is operable to cause the client device to:

determine, based on a binding indicated by the VD, one or more other widgets in the set of widgets and operations to be performed by the one or more other widgets; and convert the topic-based message such that the topic-based message includes or indicates the operations to be performed by the one or more other widgets.

21. The one or more NTCRSM of claim 18, wherein, to convert the topic-based message, execution of the instructions is operable to cause the client device to:

identify a facet based on the VD, the facet indicating a first filtering operation to be applied to data items in the widget;

determine data items in one or more other widgets of the set of widgets that are linked to the data items in the widget;

determine a second filtering operation to be applied to the linked data items; and convert the topic-based message such that the topic-based message includes or indicates the second filtering operation to be applied to the linked data items.

* * * * *